US010882361B2

(12) United States Patent
Shmagranoff et al.

(10) Patent No.: US 10,882,361 B2
(45) Date of Patent: Jan. 5, 2021

(54) TIRE WITH VARIABLE WIDTH GROOVES

(71) Applicants: Bridgestone Americas Tire Operations, LLC, Nashville, TN (US); Bridgestone Bandag, LLC, Muscatine, IA (US)

(72) Inventors: Aleksandr Ian Shmagranoff, Akron, OH (US); David M. Severyn, North Canton, OH (US); Todd A. Buxton, Norton, OH (US); Andrew D. Cerny, Riverside, IA (US); Stephen T. Miranda, Copley, OH (US)

(73) Assignees: Bridgestone Americas Tire Operations, LLC, Nashville, TN (US); Bridgestone Bandag, LLC, Muscatine, IA (US)

( * ) Notice: Subject to any disclaimer, the term of this patent is extended or adjusted under 35 U.S.C. 154(b) by 325 days.

(21) Appl. No.: 15/127,861

(22) PCT Filed: Oct. 22, 2015

(86) PCT No.: PCT/US2015/022920
§ 371 (c)(1),
(2) Date: Sep. 21, 2016

(87) PCT Pub. No.: WO2015/160490
PCT Pub. Date: Oct. 22, 2015

(65) Prior Publication Data
US 2017/0120686 A1    May 4, 2017

Related U.S. Application Data

(60) Provisional application No. 61/978,931, filed on Apr. 13, 2014.

(51) Int. Cl.
*B60C 11/13* (2006.01)
*B60C 11/04* (2006.01)
*B60C 11/03* (2006.01)

(52) U.S. Cl.
CPC ........ *B60C 11/042* (2013.01); *B60C 11/0318* (2013.01); *B60C 11/1307* (2013.01);
(Continued)

(58) Field of Classification Search
CPC .............. B60C 11/0318; B60C 11/045; B60C 2011/133; B60C 2011/1338; B60C 11/0309; B60C 11/042; B60C 11/1369
See application file for complete search history.

(56) References Cited

U.S. PATENT DOCUMENTS 2,604,920 A * 7/1952 Kirby .................. B60C 11/0309
152/151
4,736,782 A 4/1988 Kanamaru
(Continued)

FOREIGN PATENT DOCUMENTS

CN    102310723 A    1/2012
DE    3824897    *    1/1990
(Continued)

OTHER PUBLICATIONS

English machine translation of FR686949 (Year: 1930).*
(Continued)

*Primary Examiner* — Robert C Dye

(57) ABSTRACT

A tire includes a pair of sidewalls and a circumferential tread having a zigzag circumferential groove. The zigzag circumferential groove is defined by a groove bottom, a pair of groove walls, and a pair of groove edges defining an intersection between each groove wall and a top surface of the circumferential tread, wherein each of the groove edges smoothly widens and narrows along the groove. The cir-
(Continued)

cumferential tread has a first circumferential pitch with first and second circumferential pitch lengths. The first circumferential pitch includes a first zigzag circumferential groove segment and a second zigzag circumferential groove segment that form a first intersection angle. The second circumferential pitch includes a third zigzag circumferential groove segment and a fourth zigzag circumferential groove segment that form a second intersection angle different from the first intersection angle.

20 Claims, 10 Drawing Sheets

(52) U.S. Cl.
CPC ... *B60C 11/1315* (2013.01); *B60C 2011/0346* (2013.01); *B60C 2011/0353* (2013.01); *B60C 2011/133* (2013.01); *B60C 2011/1338* (2013.01)

(56) References Cited

U.S. PATENT DOCUMENTS

| | | | | |
|---|---|---|---|---|
| 5,417,268 | A | * | 5/1995 | Kishi .................. B60C 11/0309 152/209.18 |
| 5,472,030 | A | | 12/1995 | Shibata et al. |
| 5,531,256 | A | * | 7/1996 | Hashimoto ............... B60C 1/00 152/209.5 |
| 5,702,545 | A | | 12/1997 | Toyoshima et al. |
| 6,415,835 | B1 | | 7/2002 | Heinen |
| 9,104,193 | B2 | | 8/2015 | Atohira |
| 9,315,075 | B2 | * | 4/2016 | Maehara ................. B60C 11/03 |
| 2003/0010417 | A1 | | 1/2003 | Ratliff |
| 2007/0251622 | A1 | | 11/2007 | Tomita |
| 2008/0185084 | A1 | | 8/2008 | Dumigan |
| 2009/0008011 | A1 | * | 1/2009 | Jin .......................... B60C 11/00 152/209.14 |

FOREIGN PATENT DOCUMENTS

| | | | |
|---|---|---|---|
| EP | 688684 | B1 | 11/1999 |
| FR | 686949 | * | 8/1930 |
| JP | H01-153304 | * | 6/1989 |
| JP | H04-334604 | * | 11/1992 |
| JP | 08183309 | A | 7/1996 |
| JP | 2004359150 | A | 12/2004 |
| JP | 2005022530 | A | 1/2005 |
| JP | 2005067246 | A | 3/2005 |
| JP | 2007182145 | A | 7/2007 |
| JP | 2008126931 | A | 6/2008 |
| JP | 2008296795 | A | 12/2008 |
| JP | 2009113768 | A | 5/2009 |
| JP | 2011102080 | A | 5/2011 |
| JP | 2011225030 | A | 11/2011 |
| JP | 2012076664 | A | 4/2012 |
| KR | 100852872 | | 8/2008 |
| WO | WO9965814 | A2 | 12/1999 |
| WO | WO2013015799 | A1 | 1/2013 |

OTHER PUBLICATIONS

English machine translation of DE 3824897. (Year: 1990).*
English machine translation of JPH01-153304. (Year: 1989).*
English machine translation of JPH04-334604. (Year: 1992).*
195R14. Tiresize.com. [retrieved on Apr. 30, 2020]. Retrieved from Internet: <https://tiresize.com/tiresizes/195R14.htm>. (Year: 2020).*
English abstract of JPH08183309A.
English abstract of JP2012076664A.
English abstract of JP2011225030A.
English abstract of JP2011102080A.
English abstract of JP2009113768A.
English abstract of JP2008296795A.
English abstract of JP2008126931A.
English abstract of JP2007182145A.
English abstract of JP2005067246A.
English abstract of JP2005022530A.
English abstract of JP2004359150A.
English abstract of CN102310723A.
International Preliminary Report on Patentability & Written Opinion; Corresponding PCT Application No. PCT/US2015/022920; Filed Mar. 27, 2015; Authorized Officer Agnes Wittmann-Regis; dated Oct. 18, 2016.
G.E. Elsinga and J. Westerweel, "Tomographic-PIV measurement of the flow around a zigzag boundary layer trip," 15th Int Symp on Applications of Laser Techniques to Fluid Mechanics, Lisbon, Portugal, Jul. 5-8, 2010 (publicly available at http://ltces.dem.ist. utl.pt/lxlaser/lxlaser2010/upload/1592_smwmu_3.11.3.Full_1592. pdf).
L.P. Kholpanov, B.R. Ismailov, N.P. Bolgov, "Mathematical model of a turbulent gas flow in a zigzag channel," Journal of Engineering Physics, Jun. 1989, vol. 56, Issue 6, pp. 625-626 (publicly available at https://link.springer.com/article/10.1007%2FBF00870430).

* cited by examiner

 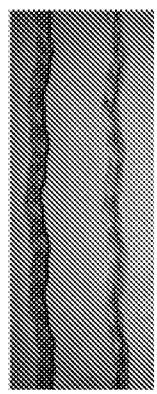 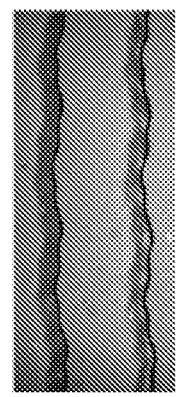
Fig. 3J    Fig. 3K    Fig. 3L
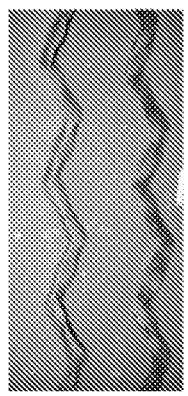 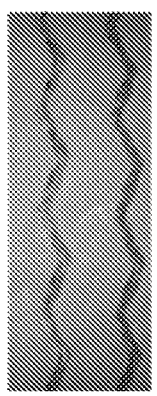 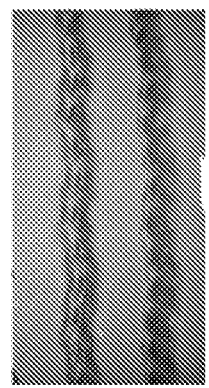
Fig. 3M    Fig. 3N    Fig. 3O
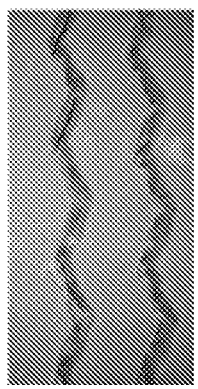
Fig. 3P

| Pattern | Piping | AW | IA | OA | CW | Y-shape? | IGW | Y-break |
|---|---|---|---|---|---|---|---|---|
| A | No | 5 | 3 | 3 | No | No | - | - |
| B | No | 15 | 3 | 3 | No | Yes | 6 | 10 |
| C | No | 5 | 22 | 3 | Yes | No | - | - |
| D | No | 15 | 22 | 3 | Yes | Yes | 3 | 5 |
| E | No | 5 | 3 | 22 | Yes | Yes | 6 | 5 |
| F | No | 15 | 3 | 22 | Yes | No | - | - |
| G | No | 5 | 22 | 22 | No | Yes | 3 | 10 |
| H | No | 15 | 22 | 22 | No | No | - | - |
| I | Yes | 5 | 3 | 3 | Yes | Yes | 3 | 10 |
| J | Yes | 15 | 3 | 3 | Yes | No | - | - |
| K | Yes | 5 | 22 | 3 | No | Yes | 6 | 5 |
| L | Yes | 15 | 22 | 3 | No | No | - | - |
| M | Yes | 5 | 3 | 22 | No | No | - | - |
| N | Yes | 15 | 3 | 22 | No | Yes | 3 | 5 |
| O | Yes | 5 | 22 | 22 | Yes | No | - | - |
| P | Yes | 15 | 22 | 22 | Yes | Yes | 6 | 10 |

Fig. 7

TIRE WITH VARIABLE WIDTH GROOVES

FIELD OF INVENTION

The present disclosure is directed to a vehicle tire and tire tread. More particularly the present disclosure is directed to a vehicle tire and tire tread that has wavy, serpentine, curvilinear, or spline grooves in an outer component, such as a tire tread. The tire may be pneumatic or non-pneumatic.

BACKGROUND

Known tire treads have a variety of grooves. The grooves may vary in width, length, depth, and planar orientation. Modifying the width, length, depth, and planar orientation of the grooves will impact various properties of the tire, such as stiffness and wear.

SUMMARY OF THE INVENTION

In one embodiment, a tire having a circumferential tread includes a zigzag circumferential groove disposed in the circumferential tread. The tire further includes a first circumferential pitch with a first circumferential pitch length and a second circumferential pitch with a second circumferential pitch length different from the first circumferential pitch length. The first circumferential pitch includes first and second segments of the zigzag circumferential groove. The first segment of the zigzag circumferential groove has a first pair of opposing groove segment edges with a first axially-outer relative maximum and a first axially-inner relative minimum. The second segment of the zigzag circumferential groove has a second pair of opposing groove segment edges with a second axially-outer relative maximum and a second axially-inner relative minimum. The second circumferential pitch includes third and fourth segments of the zigzag circumferential groove. The third segment of the zigzag circumferential groove has a third pair of opposing groove segment edges with a third axially-outer relative maximum and a third axially-inner relative minimum. The fourth segment of the zigzag circumferential groove has a fourth pair of opposing groove segment edges with a fourth axially-outer relative maximum and a fourth axially-inner relative minimum. The first and second segments of the zigzag circumferential groove form a first intersection angle and the third and fourth segments of the zigzag circumferential groove form a second intersection angle different from the first intersection angle.

In another embodiment, a tire includes a carcass ply, a pair of sidewalls, a circumferential belt, and a circumferential tread. The tread includes a plurality of main circumferential grooves and a plurality of discrete road-contacting land portions. At least one main circumferential groove is a piped zigzag circumferential groove with a point height, PH, such that $3.86<PH<2750$, wherein $PH=AW/(SW)\times 100AR\times R$, where PH=point height, AW=a maximum axial width of a circumferential groove, SW=a section width of the tire, AR=a aspect ratio of the tire, $0<AR\leq 1$, and R=a radius of a rim of the tire.

In yet another embodiment, a tire includes a pair of sidewalls and a circumferential tread having a zigzag circumferential groove. The zigzag circumferential groove is defined by a groove bottom, a pair of groove walls, and a pair of groove edges defining an intersection between each groove wall and a top surface of the circumferential tread, wherein each of the groove edges smoothly widens and narrows along the groove. The circumferential tread has a first circumferential pitch with first and second circumferential pitch lengths. The first circumferential pitch includes a first zigzag circumferential groove segment and a second zigzag circumferential groove segment that form a first intersection angle. The second circumferential pitch includes a third zigzag circumferential groove segment and a fourth zigzag circumferential groove segment that form a second intersection angle different from the first intersection angle.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 7 is a table showing experimental procedures;

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and load.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1:
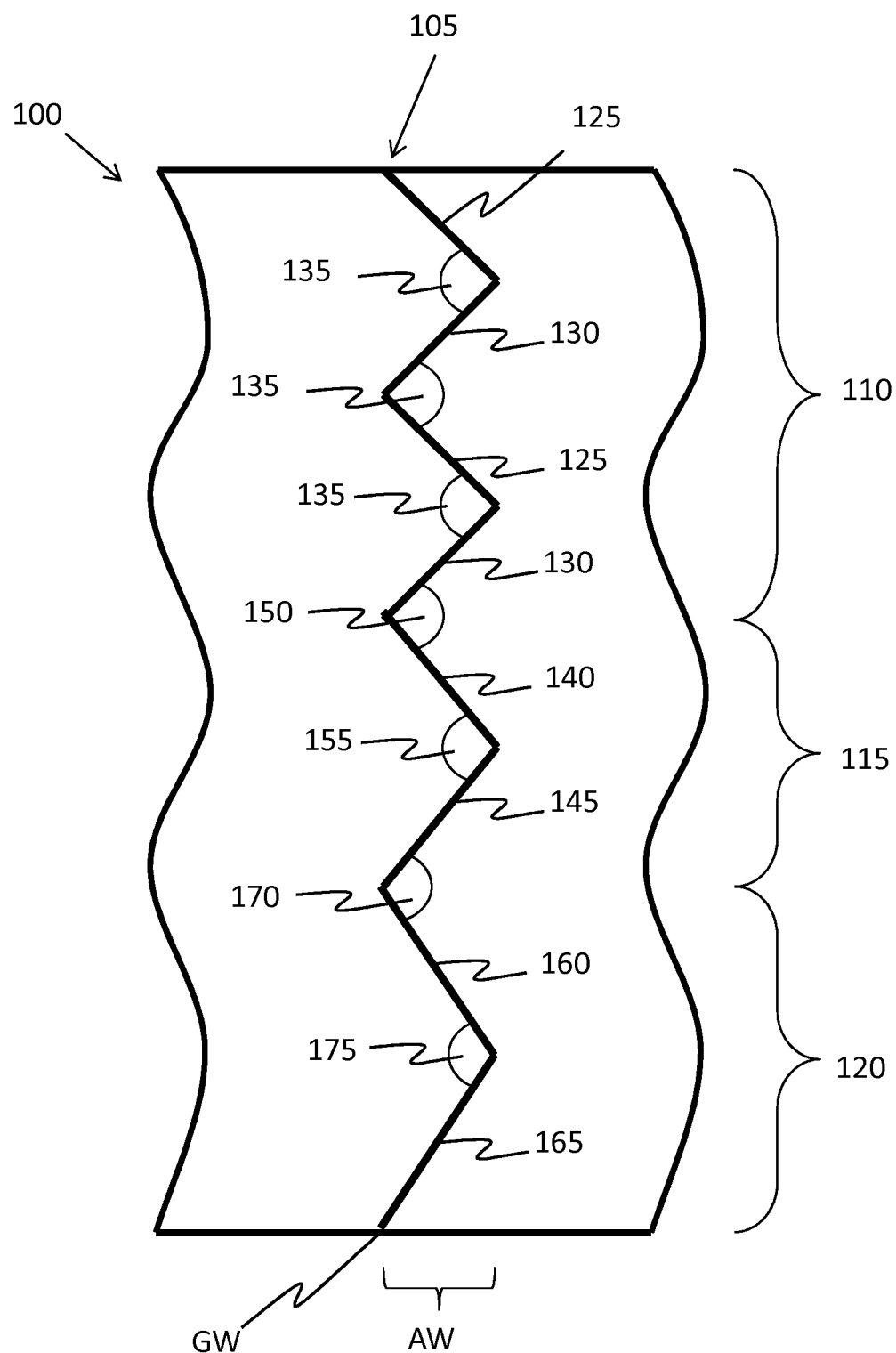
FIG. 1 is a schematic drawing of an enlarged fragmentary front elevational view of a tire tread having circumferential grooves.

FIG. 1 is a schematic drawing showing an enlarged fragmentary front elevational view of a tire tread 100 having circumferential grooves. In FIG. 1, tire tread 100 is new. It should be understood that the pattern of tire tread 100 is repeated about the circumference of the tire. The tire tread 100 may be employed on tires for various types of vehicles, including without limitation vehicles with large tires and tires for heavy duty applications.

The fragmentary view of FIG. 1 shows a single groove 105. In one embodiment (not shown), the tire tread 100 contains three circumferential grooves that define four discrete road-contacting rib portions. In alternative embodiments (not shown), the tread has four, five, or six circumferential grooves and five, six, or seven ribs. As shown, circumferential groove 105 also has a first pitch 110, a second pitch 115, and third pitch 120. These pitches extend axially across tire tread 100. In alternative embodiments (not shown), tire tread 100 contains two, three, four, or five pitches.

As shown in FIG. 1, circumferential groove 105 is a zigzag circumferential groove. In one embodiment, circumferential groove 105 is a shoulder circumferential groove. Alternatively, the circumferential groove may be an intermediate or riding circumferential groove, or a middle or center circumferential groove. In alternative embodiments (not shown), circumferential groove is a wavy, serpentine, curvilinear, spline, sinuous, or undulating circumferential groove. In another embodiment, (not shown) circumferential groove is a straight, substantially straight, geometric, bent, kinked, saw-tooth, or serrated circumferential groove. In yet another embodiment (not shown), circumferential groove is a meandering circumferential groove.

The first pitch 110 of circumferential groove 105 contains a pair of first groove segments 125 that alternate with a pair of second groove segments 130. In an alternative embodiment (not shown), the first pitch contains a single first groove segment and a single second groove segment. In another alternative embodiment (not shown), the first pitch 110 contains only one groove segment. In yet another alternative embodiment (not shown), first pitch 110 contains three or more distinct groove segments.

As shown in FIG. 1, the lengths of first groove segment 125 and second groove segment 130 are equal. In an alternative embodiment, the length of the first groove segment is about 11-20% greater than the length of the second groove segment. In another embodiment, the length of the first groove segment is about 21-40% greater than the length of the second groove segment. In another embodiment, the length of the first groove segment is at least 40% greater than the length of the second groove segment.

The first groove segment 125 and second groove segment 130 intersect each other, thus forming a first intersection angle 135. First intersection angle 135 may vary over a range of angles known to one of ordinary skill in the art. As shown, first pitch 110 contains three first intersection angles. In alternative embodiments (not shown), first pitch 110 may contain one first intersection angle, two first intersection angles, or more than three first intersection angles.

In second pitch 115, circumferential groove 105 contains a third groove segment 140 and a fourth groove segment 145. As one of ordinary skill in the art will understand, second pitch 115 differs from first pitch 110 in circumferential length or tread features, such as groove segment or their angle with respect to the circumferential direction. In an alternative embodiment (not shown), second pitch 115 contains only one groove segment. In another alternative embodiment, second pitch 115 contains more than two groove segments.

As shown in FIG. 1, the lengths of third groove segment 140 and fourth groove segment 145 are equal. Additionally, the lengths of third groove segment 140 and fourth groove segment 145 are greater than the lengths of the first groove segment 125 and second groove segment 130. In alternative embodiments (not shown), the lengths of the third and fourth groove segments are unequal. In one specific alternative embodiment, the length of the fourth groove segment is greater than the length of the third groove segment.

As shown, third groove segment 140 intersects second groove segment 130 from the first pitch 110, thus forming a second intersection angle 150. Similarly, third groove segment 140 intersects fourth groove segment 145, thus forming a third intersection angle 155.

In third pitch 120, circumferential groove 105 contains a fifth groove segment 160 and a sixth groove segment 165. In one embodiment, third pitch 120, second pitch 115, and first pitch 110 each have different circumferential lengths. In one specific embodiment, third pitch 120 has a circumferential length that is twice as long as the circumferential length of second pitch 115. As one of ordinary skill in the art will understand, a circumferential pitch length may be modulated to reduce noise emission or otherwise improve tire performance.

As shown, fifth groove segment 160 intersects fourth groove segment 145 from the second pitch 115, thus forming a fourth intersection angle 170. Similarly, fifth groove segment 160 intersects sixth groove segment 165, thus forming a fifth intersection angle 175.

As shown in FIG. 1, circumferential groove 105 also has a groove width GW and an axial width AW. Groove width, GW, is the average distance between two groove edges, measured at the tread surface, when the tire is new. Axial width, AW, is the maximum axial distance between any two groove intersection angles. In one embodiment, the axial width is 3-20 mm. In another embodiment, the axial width is 4-6 mm. In yet another embodiment, the axial width is 12-18 mm.

The axial width is proportional to a circumferential groove's point height, which is defined by the following formula:

$$PH = \frac{AW}{SW} \times 100 AR \times R$$

wherein:
PH=the point height (expressed as a positive number);
AW=the maximum axial width of a circumferential groove (in mm);
SW=the section width of the tire (in mm);
AR=the aspect ratio of the tire (expressed as a fraction), wherein $0 < AR \leq 1$;
R=the radius of the tire rim (in inches).

In one embodiment, the point height of an individual circumferential groove satisfies the criteria that $3.86 < PH < 2750$. In another embodiment, the point height of an individual circumferential groove satisfies the criteria that $5.16 < PH < 314$. In another embodiment, the point height of an individual circumferential groove satisfies the criteria that 12.7<PH<191. In yet another embodiment, the point height of an individual circumferential groove satisfies the criteria that 15.2<PH<1320.

Figure 2:
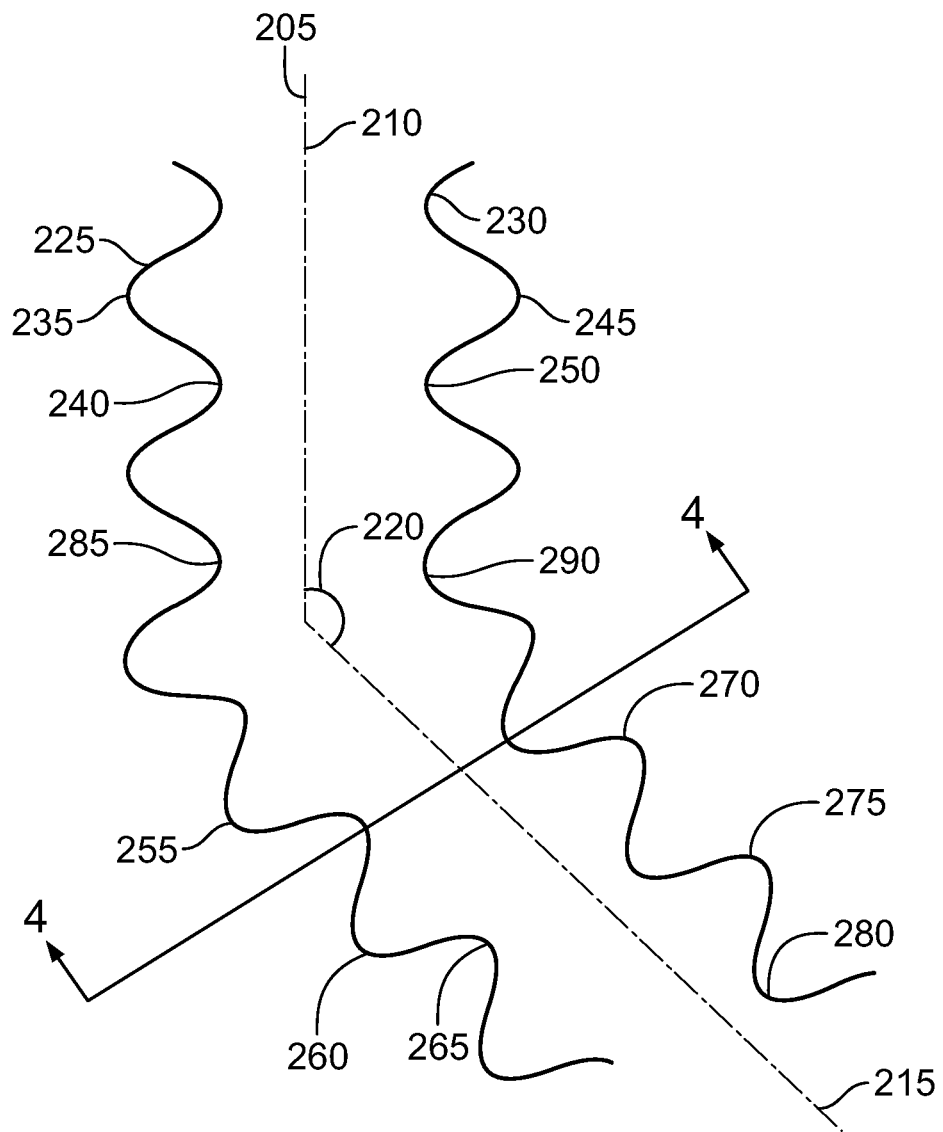
FIG. 2 is a schematic drawing of a top plan view of one embodiment of a circumferential groove.

FIG. 2 is a schematic illustration of a top plan view of one embodiment of a circumferential groove 205. Circumferential groove 205 has a first groove bottom 210 and a second groove bottom 215 that intersect at vertex 220. As shown, vertex 220 is a true Euclidian vertex. In alternative embodiments (not shown), a junction replaces vertex 220. The junction may be rounded or part of a serpentine, curvilinear, spline, sinuous, or undulating feature.

As shown in FIG. 2, circumferential groove 205 has a first groove edge 225 and a second groove edge 230. In relation to first groove bottom 210, first groove edge 225 contains first axially-outer relative maximums 235 and first axially-inner relative minimums 240. Likewise, in relation to the first groove bottom 210, second groove edge 230 contains second axially-outer relative maximums 245 and second axially-inner relative minimums 250.

As shown in FIG. 2, first groove edge 225 and second groove edge 230 are approximates of sinusoidal waves. Accordingly, the first axially-outer relative maximums 235 and second axially-outer relative maximums 245 correspond to the crests of the sinusoidal waves, and first axially-inner relative minimums 240 and second axially-inner relative minimums 250 correspond to the troughs of the sinusoidal waves. In alternative embodiments (not shown), the first and second groove edges are serpentine, curvilinear, spline, sinuous, undulating, or meandering edges. In additional alternative embodiments, the first and second groove edges are geometric waves, such as a trapezoidal wave, that preferably have rounded edges.

In one embodiment, the distance between the first axially-inner relative minimums 240 and second axially-inner relative minimums 250 is minimized. In one particular embodiment, the distance between the first axially-inner relative minimums 240 and second axially-inner relative minimums 250 is substantially minimized such that the distance between the first axially-inner relative minimums 240 and second axially-inner relative minimums 250 is not more than 10% greater than the shortest distance between two groove edges.

As shown in FIG. 2, circumferential groove 205 also has a third groove edge 255 and a fourth groove edge 270. Third groove edge 255 joins first groove edge 225 at juncture 285. Fourth groove edge 270 joins second groove edge 230 at juncture 290. In relation to second groove bottom 215, third groove edge 255 contains third axially-outer relative maximums 260 and third axially-inner relative minimums 265. Likewise, in relation to the second groove bottom 215, fourth groove edge 270 contains fourth axially-outer relative maximums 275 and fourth axially-inner relative minimums 280.

As shown in FIG. 2, third groove edge 255 and fourth groove edge 270 are approximations of sinusoidal waves. Accordingly, the third axially-outer relative maximums 260 and fourth axially-outer relative maximums 275 correspond to the crests of the sinusoidal waves, and third axially-inner relative minimums 265 and fourth axially-inner relative minimums 280 correspond to the troughs of the sinusoidal waves.

In the illustrated embodiment, the frequency of the sinusoidal waves on the third and fourth groove edges differs from the frequency of the sinusoidal waves on the first and second groove edges. In alternative embodiments (not shown), the third and fourth groove edges are serpentine, curvilinear, spline, sinuous, undulating, or meandering edges that differ from the first and second groove edges. In additional alternative embodiments (not shown), the third and fourth groove edges are geometric waves, such as a trapezoidal wave, that preferably have rounded edges.

Figure 3A:
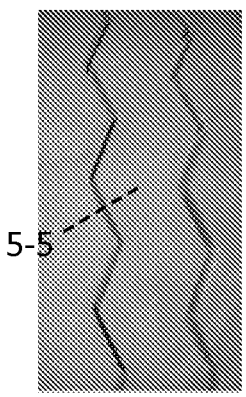
FIGS. 3A-3P are alternative embodiments of circumferential grooves.
Figure 3B:
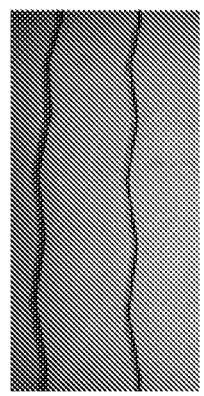
Figure 3C:
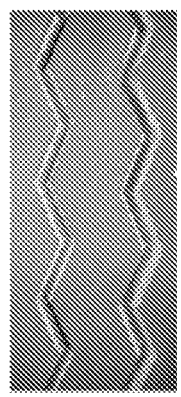
Figure 3D:
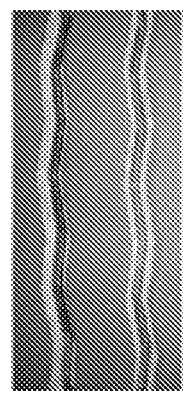
Figure 3E:
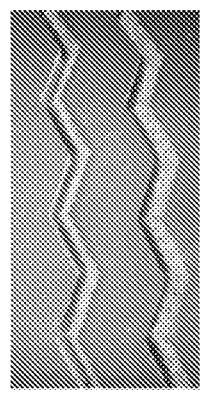
Figure 3F:
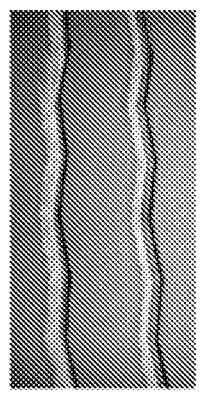
Figure 3G:
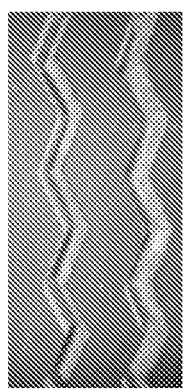
Figure 3H:
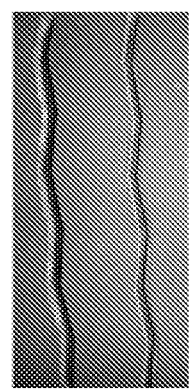
Figure 3I:
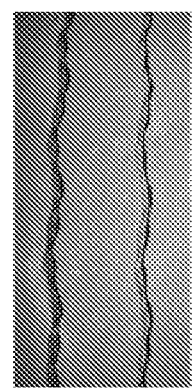

FIGS. 3A-3P illustrate alternative embodiments of the circumferential groove shown in FIG. 2. The grooves shown in FIGS. 3A-3P all contain piped groove edges. The piped groove edges smoothly widen and narrow along the groove. Preferably, as shown in FIGS. 3A-3P, the piped groove edges smoothly widen and narrow in concert.

Figure 4:
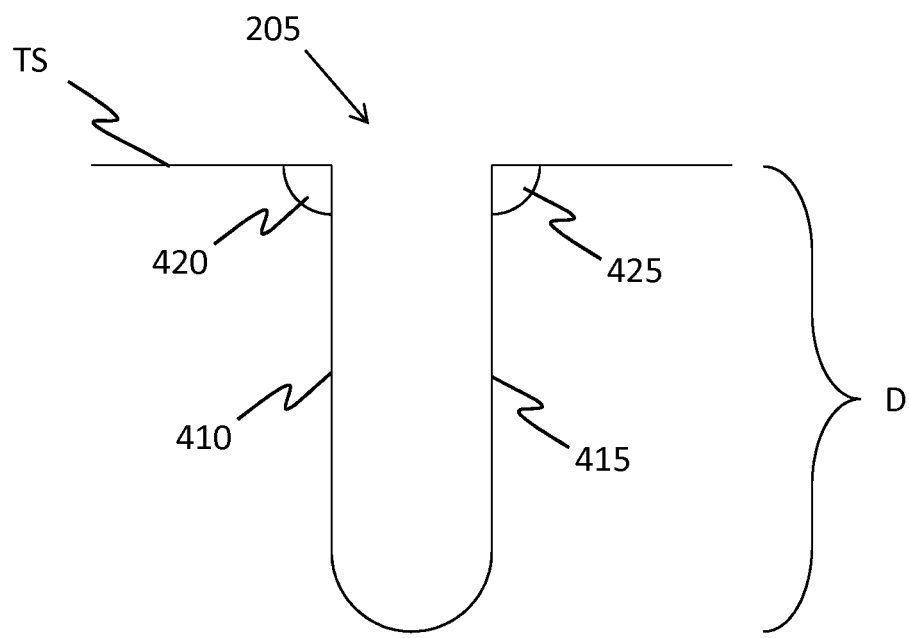
FIG. 4 is a cross-sectional view of the circumferential groove 200, taken along line 4-4 in FIG. 2.

FIG. 4 is a cross-sectional view of circumferential groove 205 taken along line 4-4 in FIG. 2. As shown in FIG. 4, circumferential groove 205 extends from the tread surface TS and has a depth D. Circumferential groove 205 has a first sidewall 410 and a second sidewall 415. As shown, the first sidewall 410 and second sidewall 415 are linear. In alternative embodiments, each sidewall may be curved. The curvature of the groove sidewall will vary over a range of applications and possibilities known to one of ordinary skill in the art.

The first sidewall 410 extends from the tread surface TS at an inside angle 420, and the second sidewall 415 extends from the tread surface TS at an outside angle 425. In one embodiment, the inside and outside angles fall within a range of 92-97°. In another embodiment, the inside and outside angles fall within a range of 107-117°. In still another embodiment, the inside and outside angles fall within a range of 92-117°.

Figure 5:
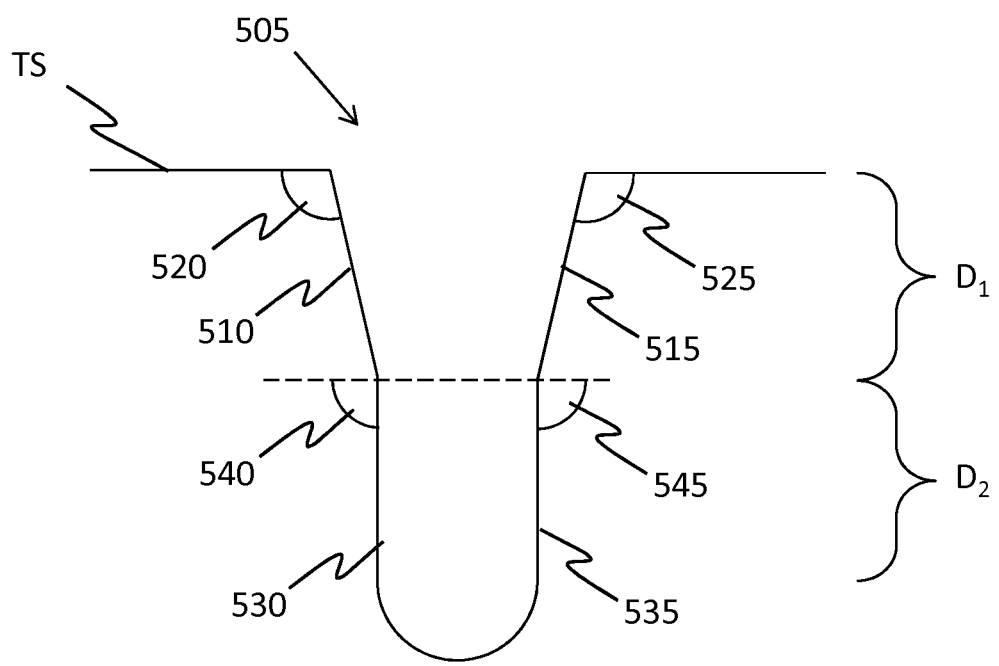
FIG. 5 is a cross-sectional view of the circumferential groove 300a taken along line 5-5 in FIG. 3A.

FIG. 5 is a cross-sectional view of the circumferential groove taken along line 5-5 in FIG. 3a. As shown in FIG. 5, circumferential groove 505 initially extends from the tread surface TS to a first depth $D_1$, and it then extends from first depth $D_1$ to a second depth $D_2$.

Circumferential groove 505 has a first sidewall segment 510, a second sidewall segment 515, a third sidewall segment 530, and a fourth sidewall segment 535. In other embodiments (not shown), the circumferential groove may have more than four sidewall segments. As shown, the sidewall segments are linear. In alternative embodiments, any given sidewall segment may be curved. The curvature of the groove segment will vary over a range of applications and possibilities known to one of ordinary skill in the art.

The first sidewall segment 510 extends from the tread surface TS at first inside angle 520, and the second sidewall segment 515 extends from the tread surface TS at first outside angle 525. In one embodiment, the first inside and outside angles fall within a range of 92-107°. In another embodiment, the first inside and outside angles fall within a range of 107-117°. In yet another embodiment, the first inside and outside angles fall within a range of 92-117°.

The third sidewall segment 530 extends from the first sidewall segment 510 at a second inside angle 540. The fourth sidewall segment 535 extends from the second sidewall segment 515 at a second outside angle 545. In one embodiment, the first inside and outside angles fall within a range of 92-107°. In another embodiment, the first inside and outside angles fall within a range of 107-117°. In yet another embodiment, the first inside and outside angles fall within a range of 92-117°.

Figure 6A:
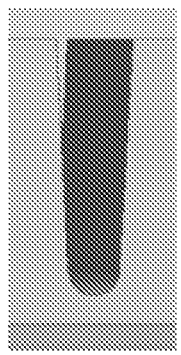
FIGS. 6A-6P are alternative embodiments of cross-sections of circumferential grooves.
Figure 6B:
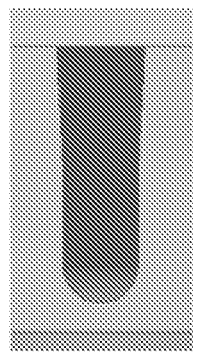
Figure 6C:
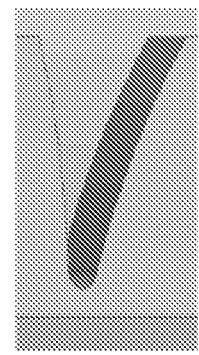
Figure 6D:
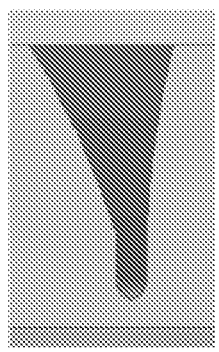
Figure 6E:
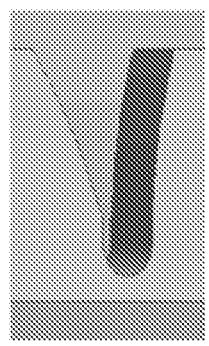
Figure 6F:
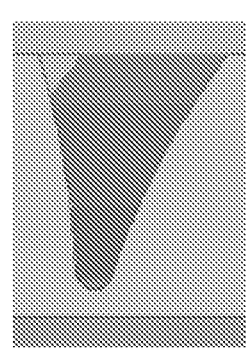
Figure 6G:
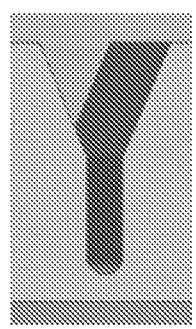
Figure 6H:
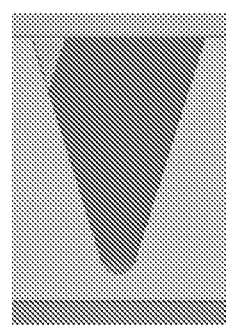
Figure 6I:
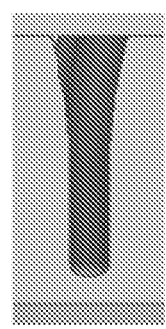
Figure 6J:
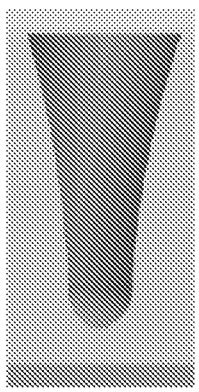
Figure 6K:
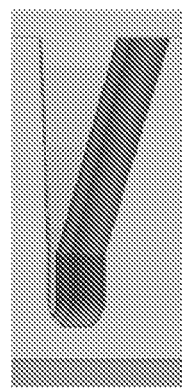
Figure 6L:
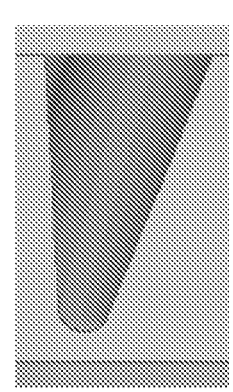
Figure 6M:
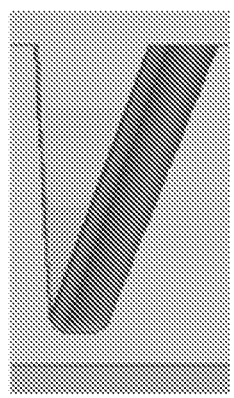
Figure 6N:
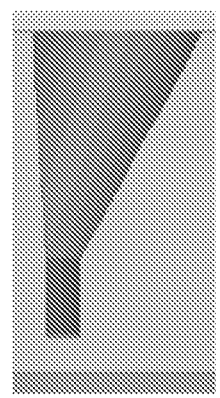
Figure 6O:
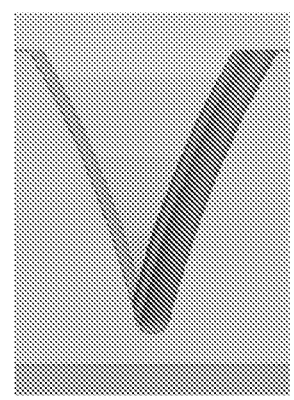
Figure 6P:
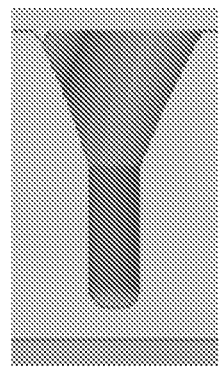

FIGS. 6A-6P are alternative embodiments of the cross-section shown in FIG. 5. As shown in FIGS. 6A-6P, the cross sections of the grooves may be, without limitation, generally u-shaped, v-shaped, or y-shaped, amongst other descriptions. The u-shaped cross sections generally have two sidewalls and a rounded or substantially flat base. The v-shaped cross sections generally have two straight sidewalls and a tightly rounded or substantially angular base. In an alternative embodiment, the v-shaped cross sections have one curved sidewall and one straight sidewall. In another embodiment, the v-shaped cross sections have two curved sidewalls. The y-shaped cross sections generally have four sidewall segments and a rounded or substantially flat base. In alternative embodiments, various sidewall segments may be curved or straight.

In one application, the tread grooves described above are for use on a pneumatic tire comprising a first annular bead and a second annular bead, a body ply extending between the first annular bead and the second annular bead, a circumferential belt disposed radially outward of the body ply and extending axially across a portion of the body ply, a circumferential tread disposed radially outward of the circumferential belt and extending axially across a portion of the body ply, a first reinforcement ply disposed radially between the circumferential tread and the circumferential belt and extending axially across a portion of the body ply, a first sidewall extending between the first annular bead and a first shoulder, the first shoulder being associated with the circumferential tread, and a second sidewall extending between the second annular bead and a second shoulder, the second shoulder being associated with the circumferential tread. In another application (not shown), the tread may be used on a non-pneumatic tire or wheel, which may not have certain components present in a pneumatic tire. In yet another application (also not shown), the tread is a retread.

In another application, the grooves shown in FIGS. 3A-3P and FIGS. 6A-P are for use on a tire that includes a carcass ply and at least one annular structure associated with the carcass ply. The tire further includes a circumferential belt or shear band region comprising a first belt ply and a second belt ply. The tire also has a cap ply disposed radially outward of the first belt ply and the second belt ply. The tire also includes a pair of sidewalls associated with at least one annular structure and the circumferential tread. In another application (not shown), the tread may be used on a non-pneumatic tire or wheel, which may not have certain components present in a pneumatic tire. In yet another application (also not shown), the tread is a retread.

As one of ordinary skill in the art will understand, the circumferential grooves described above may contain, without limitation, features such as chamfering, stone ejectors, noise resonance reduction protrusions, electronic sensors, static discharge antennas, and damage or wear indicators. Likewise, the discrete road-contacting land portions created by the circumferential grooves can come in a variety of widths and geometries. The land portions may be continuous around the tire, or they may be divided by various grooves or sipes.

As one of ordinary skill in the art would understand, the tire embodiments described in this disclosure may be configured for use on a vehicle selected from the group consisting of motorcycles, golf carts, scooters, military vehicles, passenger vehicles, hybrid vehicles, high-performance vehicles, sport-utility vehicles, light trucks, heavy trucks, heavy-duty vehicles, including, without limitation, mining vehicles, forestry vehicles, agricultural vehicles, and buses. One of ordinary skill in the art would also understand that the embodiments described in this disclosure may be utilized with a variety of tread patterns, including, without limitation, symmetrical, asymmetrical, directional, studded, and stud-free tread patterns. One of ordinary skill in the art would also understand that the embodiments described in this disclosure may be utilized, without limitation, in high-performance, winter, all-season, touring, non-pneumatic, and retread tire applications.

EXAMPLES

A 315/80R22.5 test tire was constructed using a PCT mold. 16 experimental circumferential grooves, grooves A-P, were tested by running a tire though a small stone course and a large stone course. A small stone course is a straight row filled with hard objects each having a lateral cross-section, L, wherein 5 mm≤L<10 mm. A large stone course is filled with hard objects each having a lateral cross-section, L, wherein 10 mm≤L<30 mm. In preparation for the test run, the test tire is warmed up by running at 50 mph for approximately 10 to 30 miles, and the stones are soaked with water. The test tire is then run over one of the stone courses in 10 passes. The number and size of each stone retained by each experimental groove A-P after the tire was run through a course was then recorded. The test tire is then run over a clean pavement slalom course with 30 turns at 30 mph to test the experimental groove's ability to limit number of stones retained. The number of stones retained after the slalom course was then recorded.

To conduct the experimental procedure, grooves A-P were constructed according to the table shown in FIG. 7, wherein:

AW=Axial Width (mm);

IA=Inside Angle (degrees);

OA=Outside Angle (degrees);

CW indicates whether a groove sidewall or segment is curved;

Y-shape indicates whether a groove has a y-shape;

IGW=Intermediate Groove Width (i.e., the width of the Y-shaped groove at the vertex between the upper and lower portion of the groove (mm); and Y-break is the height, measured from the bottom of the groove, to the vertex between the upper and lower portion of the groove.

Figure 8:
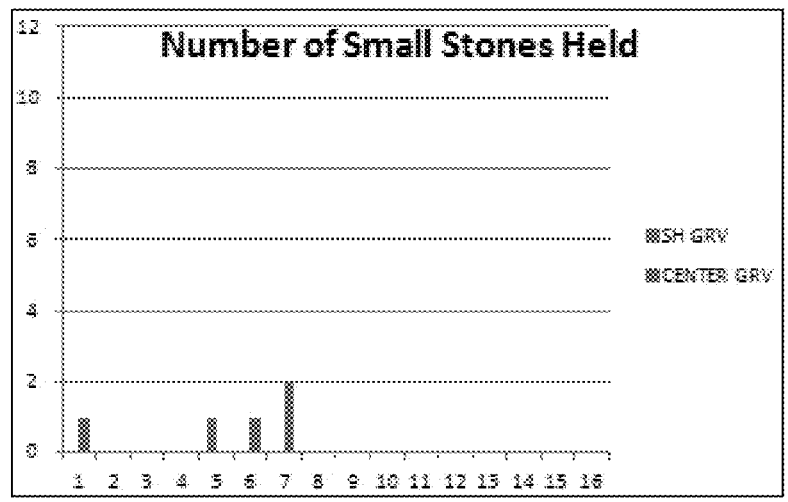
FIG. 8 is a chart showing a number of small stones held.

The grooves were then run through a small stone course. The number of small stones held in a groove after a rolling test was recorded. The results are shown in the chart in FIG. 8. The number of stones held in a groove appears on the vertical axis. The horizontal axis, labeled 1-16, corresponds to grooves A-P.

Figure 9:
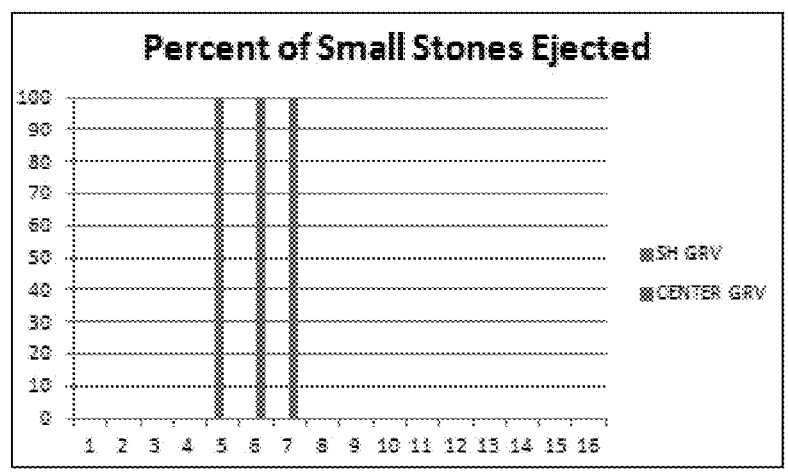
FIG. 9 is a chart showing a percent of small stones ejected.

The number of small stones ejected from a groove during a rolling test was also recorded. The results are shown in the chart in FIG. 9. The percentage of stones ejected from a groove appears on the vertical axis. The horizontal axis, labeled 1-16, corresponds to grooves A-P. Thus, grooves A-P showed good performance on the small stone course.

Figure 10:
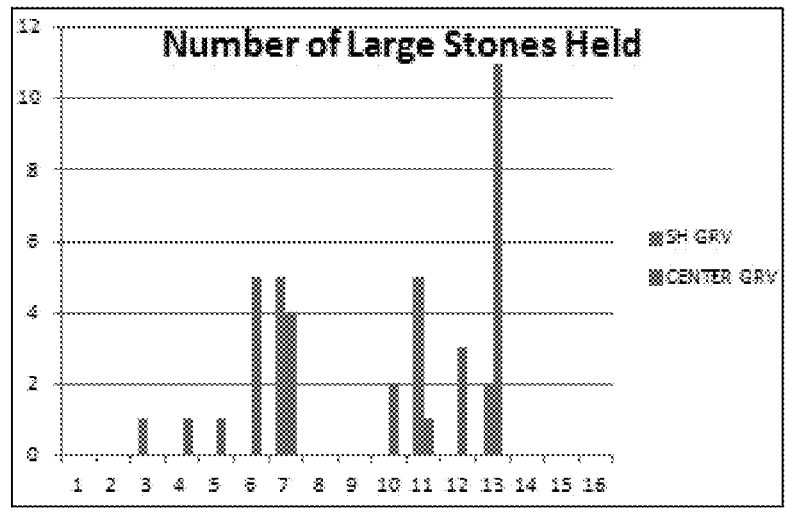
FIG. 10 is a chart showing a number of large stones held.

The grooves were then run through a large stone course. The number of large stones held in a groove after a rolling test was recorded. The results are shown in the chart in FIG. 10. The number of stones held in a groove appears on the vertical axis. The horizontal axis, labeled 1-16, corresponds to grooves A-P.

Figure 11:
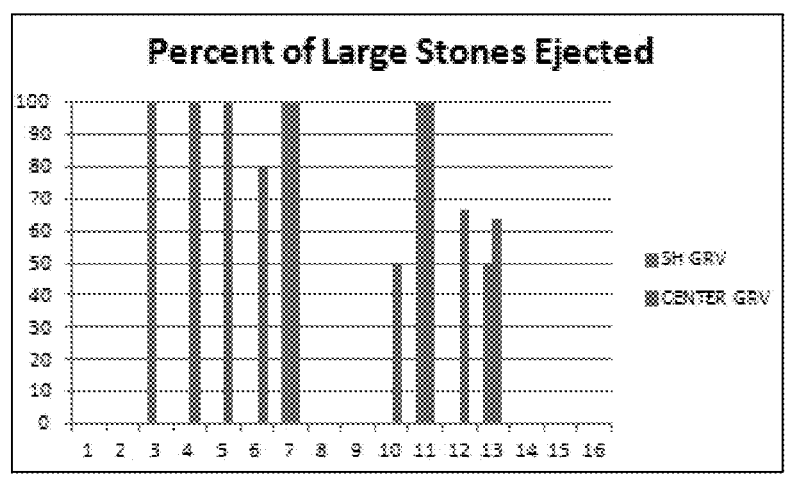
FIG. 11 is a chart showing a percent of large stones ejected.

The number of large stones ejected from a groove during a rolling test was also recorded. The results are shown in the chart in FIG. 11. The percentage of stones ejected from a groove appears on the vertical axis. The horizontal axis, labeled 1-16, corresponds to grooves A-P. Thus, grooves B, H, I, N, O, and P demonstrated excellent performance.

From experimentation, it was observed that a higher point height, lower inside angle, and inclusion of a curved groove wall will lower the number of stones held in a shoulder circumferential groove. It was also observed that a higher outside angle, the inclusion of a y-shaped groove, and the lower height of y-break will lower the number of stones held in a center circumferential groove. It was further observed that the inclusion of a y-shaped groove will increase the number of stones ejected from a center circumferential groove.

However, from all of the experimentation performed, it was determined that no one design feature had a main or predictable effect for all groove designs.

The grooves described in the present disclosure produce reduced stone retention in a tire or tire tread. These grooves thus enhance the performance of the pneumatic tire (or non-pneumatic tire), even though the complexities of the structure and behavior of the pneumatic tire are such that no complete and satisfactory theory has been propounded. Temple, *Mechanics of Pneumatic Tires* (2005). While the fundamentals of classical composite theory are easily seen in tire mechanics, the additional complexity introduced by the many structural components of pneumatic tires readily complicates the problem of predicting tire performance. Mayni, *Composite Effects on Tire Mechanics* (2005). Additionally, because of the non-linear time, frequency, and temperature behaviors of polymers and rubber, analytical design of pneumatic tires is one of the most challenging and under-appreciated engineering challenges in today's industry. Mayni.

A pneumatic tire has certain essential structural elements. United States Department of Transportation National Highway Traffic Safety Administration, *The Pneumatic Tire*, Pages 7-11 (2006). An important structural element is the tread, which influences handling on snowy, wet, dry, dusty, rocky, or off-road surfaces, amongst others. The tread must meet wear resistance, durability, low noise, and ride quality benchmarks. Attaining these benchmarks can present conflicting engineering aims.

In other words, the tread and groove characteristics affect the other components of a pneumatic tire, leading to a number of components interrelating and interacting in such a way as to affect a group of functional properties (noise, handling, durability, comfort, high speed, mass, and rolling resistance, amongst others), resulting in a completely unpredictable and complex composite.

For example, in regard to the grooves described in Table 1 above, the outside angle and presence of piping in a shoulder circumferential groove have interactions with many other tread components. Thus, changing even one component can lead to directly improving or degrading as many as ten functional characteristics, as well as altering the interaction between that one component and as many as six other structural components. Each of those six interactions may thereby indirectly improve or degrade those ten functional characteristics. Whether each of these functional characteristics is improved, degraded, or unaffected, and by what amount, certainly would have been unpredictable without the experimentation and testing conducted by the inventors.

Thus, for example, when the structure (e.g., twist, cord construction, axial width, etc.) of the bead of a pneumatic tire is modified with the intent to improve one functional property of the pneumatic tire, any number of other functional properties may be unacceptably degraded. Furthermore, the interaction between the grooves and the apex, bead, belt, overlay, carcass, and tread may also unacceptably affect the functional properties of the pneumatic tire. A modification of the tread or groove structure may not even improve that one functional property because of these complex interrelationships.

Thus, as stated above, the complexity of the interrelationships of the multiple components makes the actual result of modification of a groove impossible to predict or foresee from the infinite possible results. Only through extensive experimentation have the groove structures of the present disclosure been revealed as an excellent, unexpected, and unpredictable option for a tire or tire tread.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire having a circumferential tread, the tire comprising:
   a zigzag circumferential groove disposed in the circumferential tread, the zigzag circumferential groove having a groove bottom and a depth measured from a top surface of the circumferential tread to the groove bottom;
   a first circumferential pitch with a first circumferential pitch length and a second circumferential pitch with a second circumferential pitch length different from the first circumferential pitch length,
   wherein the depth of the zigzag circumferential groove is constant along the first circumferential pitch length and the second circumferential pitch length,
   wherein the first circumferential pitch includes first and second segments of the zigzag circumferential groove, the first segment of the zigzag circumferential groove having a first pair of opposing groove segment edges with a first axially-outer relative maximum and a first axially-inner relative minimum in relation to the groove bottom, and the second segment of the zigzag circumferential groove having a second pair of opposing groove segment edges with a second axially-outer relative maximum and a second axially-inner relative minimum in relation to the groove bottom,
   wherein the second circumferential pitch includes third and fourth segments of the zigzag circumferential groove, the third segment of the zigzag circumferential groove having a third pair of opposing groove segment edges with a third axially-outer relative maximum and a third axially-inner relative minimum in relation to the groove bottom, and the fourth segment of the zigzag circumferential groove having a fourth pair of opposing groove segment edges with a fourth axially-outer relative maximum and a fourth axially-inner relative minimum in relation to the groove bottom,
wherein the first and second segments of the zigzag circumferential groove form a first intersection angle and the third and fourth segments of the zigzag circumferential groove form a second intersection angle different from the first intersection angle, and
wherein each of the groove segment edges is substantially sinusoidal, and wherein the frequency of the sinusoidal waves of the third and fourth groove edges differs from the frequency of the sinusoidal waves of the first and second groove edges.

2. The tire of claim 1, wherein the zigzag circumferential groove has an axial width equal to a maximum axial distance between the first intersection angle and the second intersection angle and wherein the axial width is greater than 4 mm and less than 20 mm.

3. The tire of claim 2, wherein the axial width is between 5 and 15 millimeters.

4. The tire of claim 1, wherein a distance between the first axially-inner relative minimum and the second axially-inner relative minimum is substantially minimized to be no more than 10% greater than the shortest distance between the first pair of opposing groove segment edges, and wherein a distance between the third axially-inner relative minimum and the fourth axially-inner relative minimum is substantially minimized to be no more than 10% greater than the shortest distance between the second pair of opposing groove segment edges.

5. The tire of claim 1, wherein the zigzag circumferential groove has a generally u-shaped cross section.

6. The tire of claim 1, wherein the zigzag circumferential groove has a y-shaped cross section.

7. The tire of claim 1, wherein the zigzag circumferential groove has a point height, PH, such that 3.86<PH<2750, where:

$$PH = \frac{AW}{SW} \times 100\, AR \times R$$

where PH=point height;
where AW=a maximum axial width of a circumferential groove (in millimeters);
where SW=a section width of the tire (in millimeters);
where AR=an aspect ratio of the tire, wherein 0<AR≤1; and
where R=a radius of a rim of the tire (in inches).

8. A tire comprising:
a carcass ply;
a pair of sidewalls;
a circumferential belt; and
a circumferential tread including: a plurality of main circumferential grooves and a plurality of discrete road-contacting land portions, wherein at least one main circumferential groove is a zigzag circumferential groove having a constant depth and substantially sinusoidal groove edges, wherein the frequency of the sinusoidal waves of a first pair of groove edges of a first groove segment differs from the frequency of the sinusoidal waves of a second pair of groove edges of a second groove segment, with a point height of the zigzag circumferential groove, PH, such that 3.86<PH<2750, wherein:

$$PH = \frac{AW}{SW} \times 100\, AR \times R$$

where PH=point height,
where AW=a maximum axial width of a circumferential groove (in millimeters),
where SW=a section width of the tire (in millimeters),
where AR=a aspect ratio of the tire, wherein 0<AR≤1, and
where R=a radius of a rim of the tire (in inches).

9. The tire of claim 8, wherein the point height of the zigzag circumferential groove is between 15.2 and 1320.

10. The tire of claim 8, wherein the point height of the zigzag circumferential groove is between 5.16 and 314.

11. The tire of claim 10, wherein the point height of the zigzag circumferential groove is between 12.7 and 191.

12. The tire of claim 8, wherein each of the plurality of main circumferential grooves has a y-shaped cross section.

13. The tire of claim 8, further comprising a cap ply disposed radially outward of the circumferential belt.

14. A tire comprising:
a pair of sidewalls;
a circumferential tread including:
a zigzag circumferential groove defined by a groove bottom, a pair of groove walls, and a pair of groove edges defining an intersection between each groove wall and a top surface of the circumferential tread, wherein each of the groove edges smoothly widens and narrows along a segment of the zigzag circumferential groove in relation to the groove bottom, and wherein a depth of the zigzag circumferential groove is constant along the segment of the zigzag circumferential groove,
a first circumferential pitch with a first circumferential pitch length and a second circumferential pitch with a second circumferential pitch length different from the first circumferential pitch length,
wherein the first circumferential pitch includes a first zigzag circumferential groove segment and a second zigzag circumferential groove segment that form a first intersection angle, and
wherein the second circumferential pitch includes a third zigzag circumferential groove segment and a fourth zigzag circumferential groove segment that form a second intersection angle different from the first intersection angle; and
wherein the groove edges of each of the groove segments is substantially sinusoidal, and wherein the frequency of the sinusoidal waves of the edges of the third and fourth groove segments differs from the frequency of the sinusoidal waves of the edges of the first and second groove segments.

15. The tire of claim 14, wherein an axial width of the circumferential groove is between 5 and 15 millimeters,
wherein a first wall of the pair of groove walls extends from the circumferential tread at an inside angle of 3 degrees,
wherein a second wall of the pair of groove walls extends from the circumferential tread at an outside angle between 3 and 22 degrees,
wherein the circumferential groove has a y-shaped cross section including a vertex between an upper and a lower portion of the groove,
wherein an intermediate groove width of the y-shaped groove at the vertex is between 3 and 6 millimeters, and
wherein a height measured from the bottom of the groove to the vertex is between 5 and 10 millimeters.

16. The tire of claim 14, wherein an axial width of the circumferential groove is between 5 and 15 millimeters,
   wherein a first wall of the pair of groove walls extends from the circumferential tread at an inside angle between 3 and 22 degrees, and
   wherein a second wall of the pair of groove walls extends from the circumferential tread at an outside angle between 3 and 22 degrees.

17. The tire of claim 14, wherein an axial width of the circumferential groove is between 5 and 15 millimeters,
   wherein a first wall of the pair of groove walls extends from the circumferential tread at an inside angle between 3 and 22 degrees,
   wherein a second wall of the pair of groove walls extends from the circumferential tread at an outside angle between 3 and 22 degrees,
   wherein at least one of the first wall and the second wall is curved,
   wherein the circumferential groove has a y-shaped cross section including a vertex between an upper and a lower portion of the groove,
   wherein an intermediate groove width of the y-shaped groove at the vertex is between 3 and 6 millimeters, and
   wherein a height measured from the bottom of the groove to the vertex is between 5 and 10 millimeters.

18. The tire of claim 14, wherein an axial width of the circumferential groove is 15 millimeters,
   wherein a first wall of the pair of groove walls extends from the circumferential tread at an inside angle between 3 and 22 degrees,
   wherein a second wall of the pair of groove walls extends from the circumferential tread at an outside angle between 3 and 22 degrees,
   wherein the circumferential groove has a y-shaped cross section including a vertex between an upper and a lower portion of the groove,
   wherein an intermediate groove width of the y-shaped groove at the vertex is between 3 and 6 millimeters, and
   wherein a height measured from the bottom of the groove to the vertex is between 5 and 10 millimeters.

19. The tire of claim 14, wherein an axial width of the circumferential groove is 5 millimeters,
   wherein a first wall of the pair of groove walls extends from the circumferential tread at an inside angle between 3 and 22 degrees,
   wherein a second wall of the pair of groove walls extends from the circumferential tread at an outside angle between 3 and 22 degrees, and
   wherein at least one of the first wall and the second wall is curved.

20. The tire of claim 14, wherein an axial width of the circumferential groove is between 5 and 15 millimeters,
   wherein a first wall of the pair of groove walls extends from the circumferential tread at an inside angle between 3 and 22 degrees,
   wherein a second wall of the pair of groove walls extends from the circumferential tread at an outside angle between 3 and 22 degrees,
   wherein at least one of the first wall and the second wall is curved,
   wherein the circumferential groove has a y-shaped cross section including a vertex between an upper and a lower portion of the groove,
   wherein an intermediate groove width of the y-shaped groove at the vertex is between 3 and 6 millimeters, and
   wherein a height measured from the bottom of the groove to the vertex is 10 millimeters.

* * * * *